US012528302B2

(12) United States Patent
Takagi et al.

(10) Patent No.: US 12,528,302 B2
(45) Date of Patent: Jan. 20, 2026

(54) IMAGE FORMING APPARATUS AND MEDIUM ABNORMALITY DETECTION METHOD

(71) Applicant: Toshiba Tec Kabushiki Kaisha, Tokyo (JP)

(72) Inventors: Yuki Takagi, Singapore (SG); Akira Suzuki, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 18/470,728

(22) Filed: Sep. 20, 2023

(65) Prior Publication Data

US 2025/0091365 A1 Mar. 20, 2025

(51) Int. Cl.
*B41J 11/00* (2006.01)
*B65H 7/02* (2006.01)
*B65H 26/02* (2006.01)

(52) U.S. Cl.
CPC .......... *B41J 11/006* (2013.01); *B41J 11/0095* (2013.01); *B41J 2202/31* (2013.01); *B41J 2203/011* (2020.08)

(58) Field of Classification Search
CPC . B65H 7/02; B65H 7/14; B65H 26/00; B65H 26/02; B65H 2511/528; B65H 2601/255; B65H 2553/61; B41J 11/006; B41J 11/0095; B41J 11/70; B41J 11/66; G03G 15/70
See application file for complete search history.

(56) References Cited

U.S. PATENT DOCUMENTS

| | | | | |
|---|---|---|---|---|
| 2008/0131177 A1* | 6/2008 | Aratachi | G03G 15/70 399/323 |
| 2008/0169602 A1* | 7/2008 | Shingai | B65H 7/02 271/265.02 |
| 2010/0301550 A1* | 12/2010 | Muratani | B65H 7/06 271/264 |
| 2019/0121275 A1 | 4/2019 | Akiyama | |
| 2019/0359444 A1* | 11/2019 | Eoka | B65H 35/006 |

FOREIGN PATENT DOCUMENTS

| | | | |
|---|---|---|---|
| CN | 201841763 U * | 5/2011 | B65H 26/02 |
| JP | 2011253011 A * | 12/2011 | |
| JP | 2013184765 A * | 9/2013 | |

* cited by examiner

*Primary Examiner* — Luis A Gonzalez
(74) *Attorney, Agent, or Firm* — FOLEY & LARDNER LLP

(57) ABSTRACT

A thermal printer 1 that forms an image on sheet-shaped paper P using a print head 21 and discharges the paper P through a discharge port, the printer 1 including: an upper detection unit 31 provided closer to a side of the discharge port than to the print head 21 in a conveyance path of the paper P, the upper detection unit 31 being provided above the conveyance path and configured to detect an upward bias by the paper P; and a lower detection unit 32 provided closer to the side of the discharge port than to the print head 21 in the conveyance path, the lower detection unit 32 being provided below the conveyance path and configured to detect a downward bias by the paper P.

15 Claims, 11 Drawing Sheets

IMAGE FORMING APPARATUS AND MEDIUM ABNORMALITY DETECTION METHOD

FIELD

Embodiments described herein relate generally to an image forming apparatus.

BACKGROUND

In the related art, known thermal printer including an anti-jam mechanism including a detection unit installed downstream of a platen roller in a paper conveyance path. According to such an anti-jam mechanism, it is possible to detect occurrence of a paper jam in the vicinity of a paper discharge position and pulling of paper by a user.

DETAILED DESCRIPTION

Figure 1:
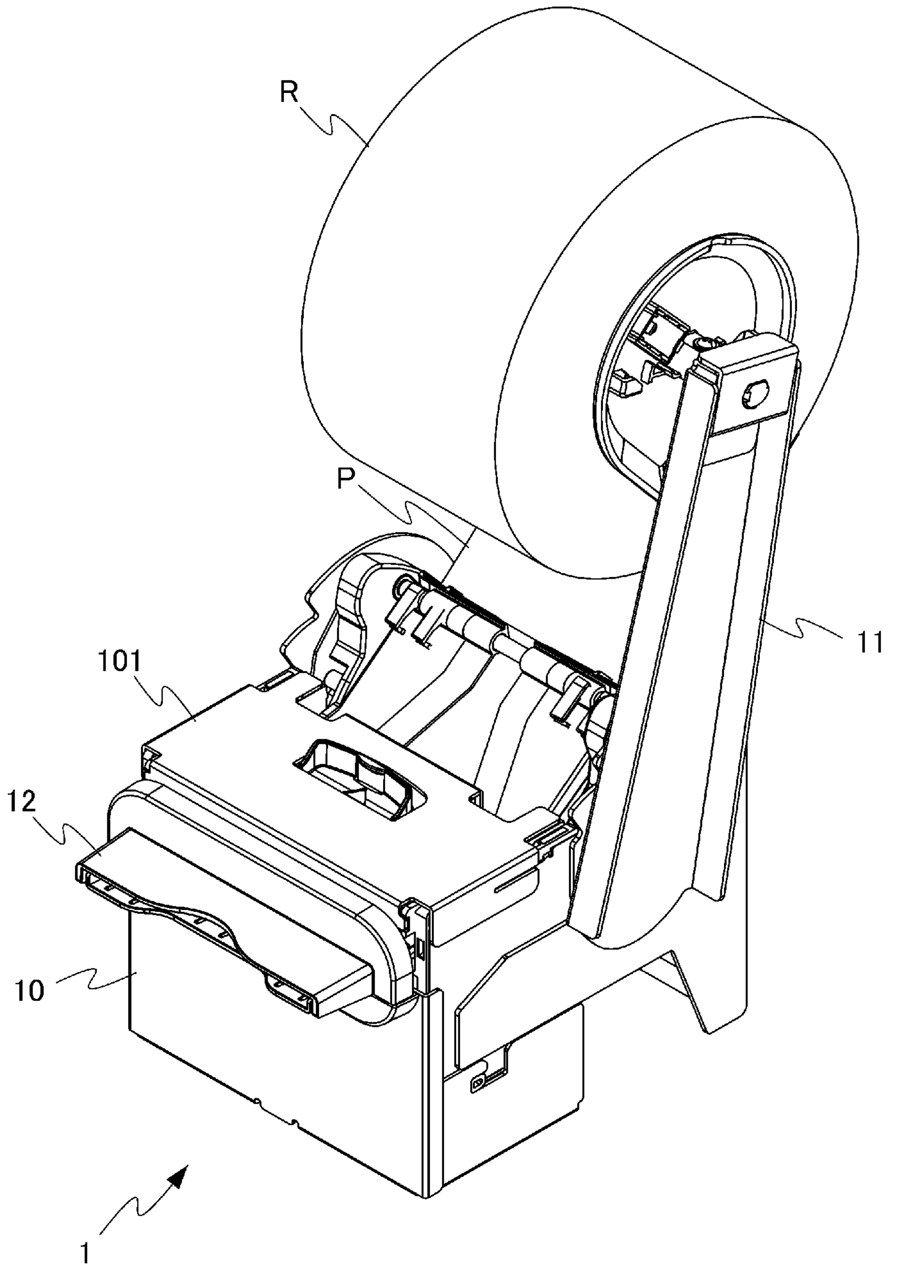
FIG. 1 is a perspective view illustrating a configuration of a thermal printer according to an embodiment.

A problem to be solved by at least one embodiment of the present disclosure is to provide a technique capable of detecting an abnormality related to paper discharging with higher accuracy.

In general, according to at least one embodiment, provided is an image forming apparatus that forms an image on a sheet-shaped medium using a print head and discharges the medium through a discharge port, the apparatus including: a first detection unit (first detector) provided closer to a side of the discharge port than to the print head in a conveyance path of the medium, the first detection unit being provided on one side in a thickness direction of the medium on the conveyance path and configured to detect a bias by the medium toward the one side; and a second detection unit (second detector) provided closer to the side of the discharge port than to the print head in the conveyance path, the second detection unit being provided on the other side in the thickness direction of the medium on the conveyance path and configured to detect a bias by the medium toward the other side.

One embodiment provides a medium abnormality detection method of detecting an abnormality related to discharging of a medium in an image forming apparatus that forms an image on the sheet-shaped medium using a print head and discharges the medium through a discharge port, the method including detecting, by a processor, the abnormality related to the discharging of the medium, in which the detection of the abnormality is based on a detection result from a first detection unit provided closer to a side of the discharge port than to the print head in a conveyance path of the medium, the first detection unit being provided on one side in a thickness direction of the medium on the conveyance path and configured to detect a bias by the medium toward the one side, and a detection result from a second detection unit provided closer to the side of the discharge port than to the print head in the conveyance path, the second detection unit being provided on the other side in the thickness direction of the medium on the conveyance path and configured to detect a bias by the medium toward the other side.

Hereinafter, embodiments of the present disclosure will be described with reference to the drawings. In each drawing, the same configuration will be denoted by the same reference numeral.

(Configuration of Thermal Printer)

Figure 2:
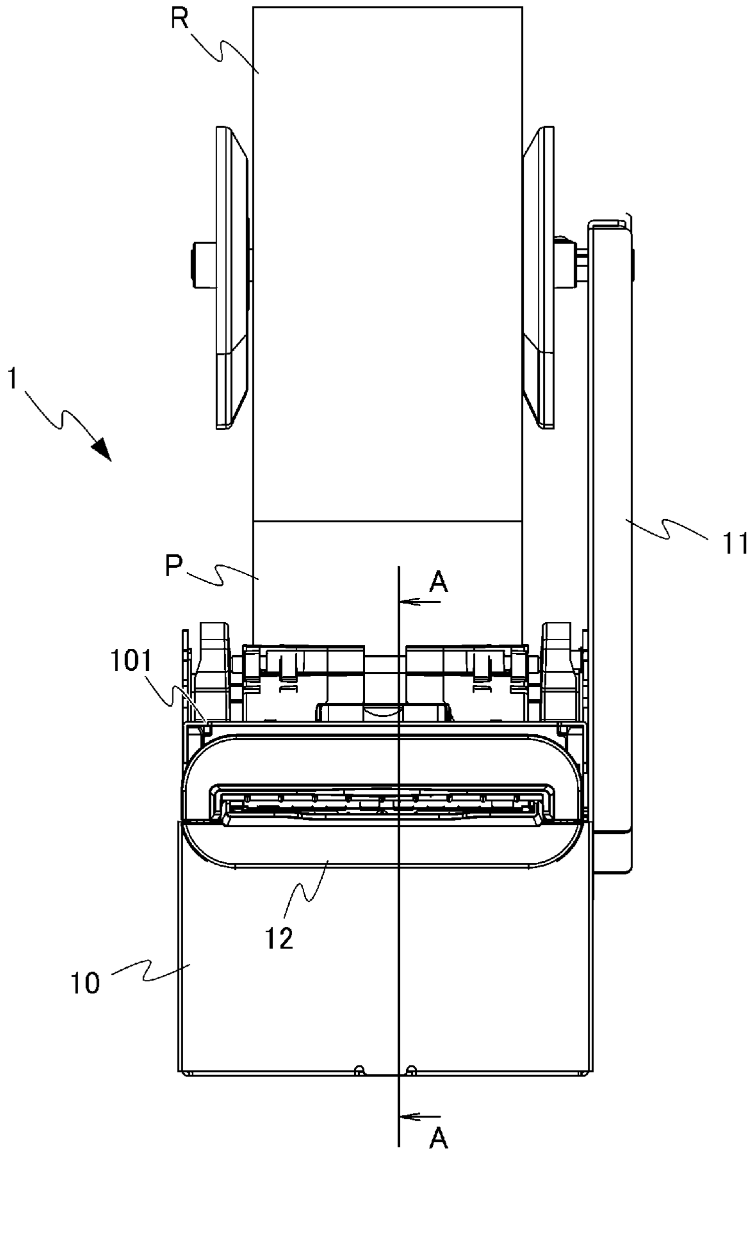
FIG. 2 is a front view illustrating the configuration of the thermal printer.
Figure 3:
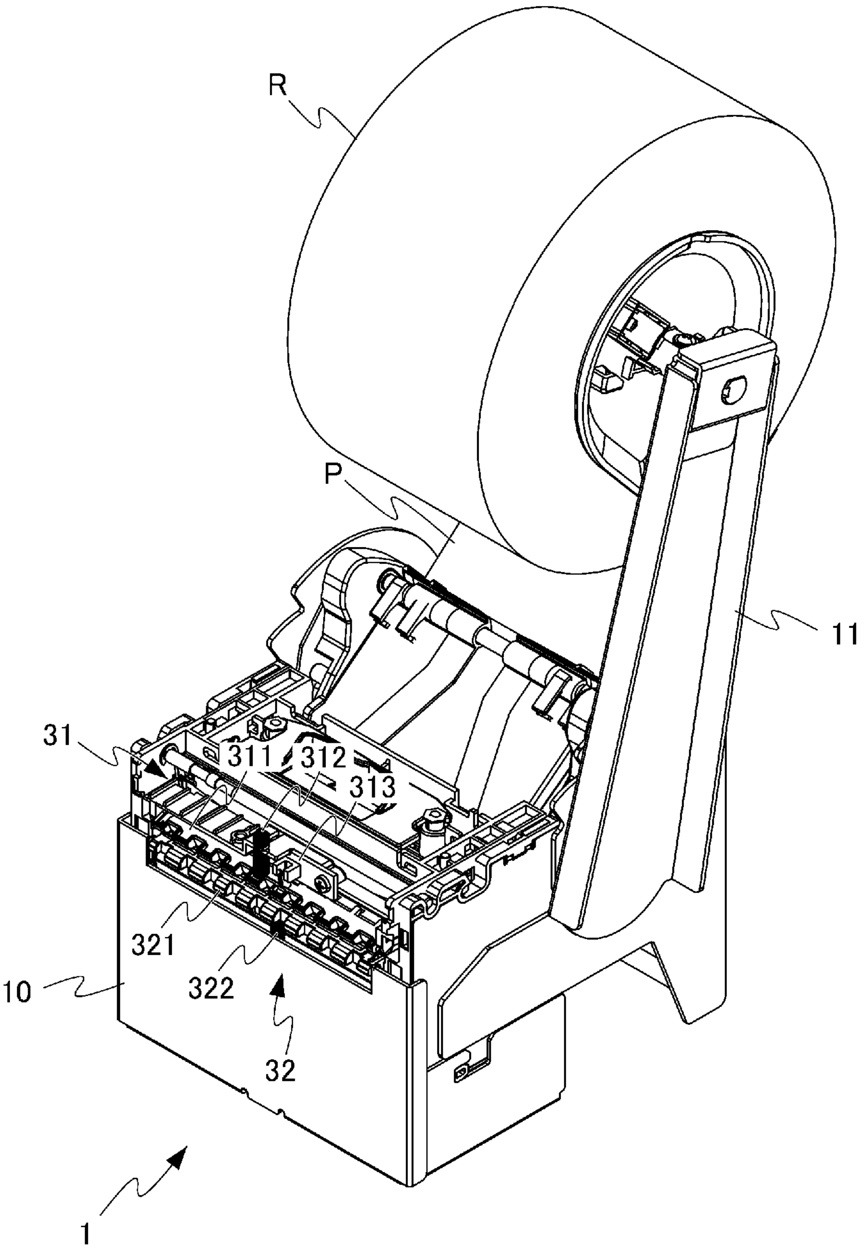
FIG. 3 is a perspective view illustrating the thermal printer in a state in which a bezel is removed.
Figure 4:
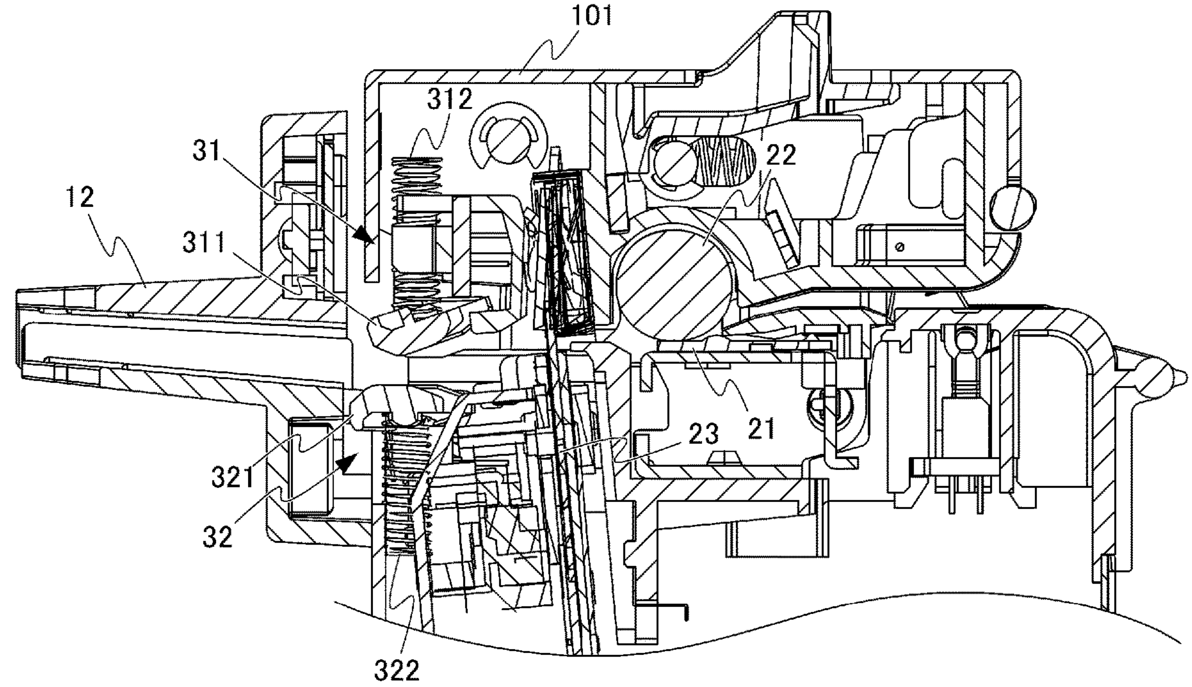
FIG. 4 is a cross-sectional view of a main part taken along line A-A in FIG. 2.

A configuration of a thermal printer according to at least one embodiment will be described. FIGS. 1 and 2 are a perspective view and a front view respectively illustrating a configuration of the thermal printer according to the embodiment. FIG. 3 is a perspective view illustrating the thermal printer in a state in which a bezel is removed according to the embodiment. FIG. 4 is a cross-sectional view of a main part taken along line A-A in FIG. 2.

As illustrated in FIGS. 1 to 4, a thermal printer 1 according to the present embodiment is an image forming apparatus using paper P unwound from roll paper R as a printing medium. The paper P is thermal paper, and the thermal printer 1 forms an image on the paper P by heating the paper P. The thermal printer 1 includes a housing 10, a support arm 11, a bezel 12, a thermal head 21, a platen roller 22, a cutter unit 23, an upper detection unit 31, and a lower detection unit 32.

The housing 10 is formed in an approximately box shape defining an internal space, and the internal space accommodates the thermal head 21, the platen roller 22, the cutter unit 23, the upper detection unit 31, and the lower detection unit 32. The support arm 11 is a member formed to extend in one direction. Further, the support arm has one end connected to the housing 10 and the other end configured to support the roll paper R above the housing 10 so as to enable the roll paper R to be rotatable in a direction in which the paper P is unwound. Additionally, a part of the housing 10 is formed as a cover 101 covering the internal space.

A paper feed port and a paper discharge port are provided in the housing 10, and a paper conveyance path is formed in the internal space and communicated therein in a direction vertically intersecting the paper feed port and the paper discharge port. The paper P is inserted into the paper conveyance path from the paper feed port and discharged to the outside of the housing 10 from the paper discharge port. The bezel 12 is formed to allow the paper P discharged through the paper discharge port to be placed thereon, and is attached to the outside of the housing 10. The cover 101 is provided at a position where a user can easily access the paper conveyance path by removing the cover 101 from the housing 10.

The thermal head 21 and the platen roller 22 are provided upstream of the paper conveyance path, that is, provided on the paper feed port side. The upper detection unit 31 and the lower detection unit 32 are provided downstream of the paper conveyance path, that is, provided on the paper discharge port side. The cutter unit 23 is provided between the thermal head 21 and the platen roller 22, and the upper detection unit 31 and the lower detection unit 32.

The thermal head 21 has a plurality of heating elements that face one surface of the paper P in the paper conveyance path and are adjacent in the width direction of the paper P. The thermal head 21 forms an image on the paper P by allowing the plurality of heating elements to generate heat in response to input pulse waves. The platen roller 22 is configured to press, against the thermal head 21, the paper P on the paper conveyance path. The platen roller 22 conveys the paper P from the paper feed port side to the paper discharge port side on the paper conveyance path. The cutter unit 23 has a fixed blade and a movable blade. Further, the cutter unit 23 cuts the paper P printed by the thermal head 21 by moving the movable blade toward the fixed blade.

The upper detection unit 31 is provided on the upper side of the paper conveyance path in the vicinity of the paper discharge port. The upper detection unit 31 has an upper flapper 311, an upper biasing member 312, and an upper sensor 313. The upper flapper 311 is a member formed to extend in the width direction of the paper P. At least a part of the upper flapper 311 may be movably provided in the vertical direction. In the present embodiment, the upper flapper 311 is provided around an axis that is oriented in the width direction of the paper P so as to be rotatable within a predetermined rotation range. The upper biasing member 312 is a member that biases the upper flapper 311 downwards, and is configured as a compression coil spring in the present embodiment. The upper sensor 313 detects that the upper flapper 311 is moved upwards by a predetermined distance or more. The upper sensor 313 is, for example, a switch or a photoelectric sensor that detects a detected piece protruding upwards from the upper flapper 311.

The lower detection unit 32 is provided on the lower side of the paper conveyance path in the vicinity of the paper discharge port. The lower detection unit 32 has a lower flapper 321, a lower biasing member 322, and a lower sensor 323 (not illustrated). The lower flapper 321 is a member formed to extend in the width direction of the paper P. At least a part of the lower flapper 321 may be movably provided in the vertical direction. In the present embodiment, the lower flapper 321 is provided around an axis that is oriented in the width direction of the paper P so as to be rotatable within a predetermined rotation range. The lower biasing member 322 is a member that biases the lower flapper 321 upwards. In the present embodiment, the lower biasing member 322 is configured as a compression coil spring similarly to the upper biasing member 312. The lower sensor 323 detects that the lower flapper 321 is moved downwards by a predetermined distance or more. The lower sensor 323 is, for example, a switch or a photoelectric sensor that detects a detected piece protruding downwards from the lower flapper 321.

The upper detection unit 31 can detect that the paper P is biased upwards in the paper conveyance path. Similarly, the lower detection unit 32 can detect that the paper P is biased downwards in the paper conveyance path. The upper detection unit 31 and the lower detection unit 32 are respectively biased by the upper biasing member 312 and the lower biasing member 322 in the direction opposite the biasing direction of the paper P to be detected. As a biasing force of each of the upper biasing member 312 and the lower biasing member 322, more specifically, a spring load is reduced, each of the upper biasing member 312 and the lower biasing member 322 has high detection sensitivity with respect to the bias of the paper P. In the present embodiment, a vertical separation distance between the upper flapper 311 and the lower flapper 321 is set to 2 to 3 mm. Therefore, at least the upper flapper 311 is substantially configured not to contact the paper P if the normal paper P is discharged. Further, the spring load of each of the upper biasing member 312 and the lower biasing member 322 is about 0.2 N in the non-biased state and about 0.23 N in the biased state. With this degree of spring load, at the time of discharging the paper P formed to be bent to the extent that a paper jam does not occur, even if the paper P contacts the upper flapper 311, the upper flapper 311 is not sufficiently biased to cause the upper sensor 313 to detect that the upper flapper 311 is moved upwards. In the present embodiment, the upper biasing member 312 and the lower biasing member 322 have the same spring load, but may have different spring loads.

(Configuration of Control System)

Figure 5:
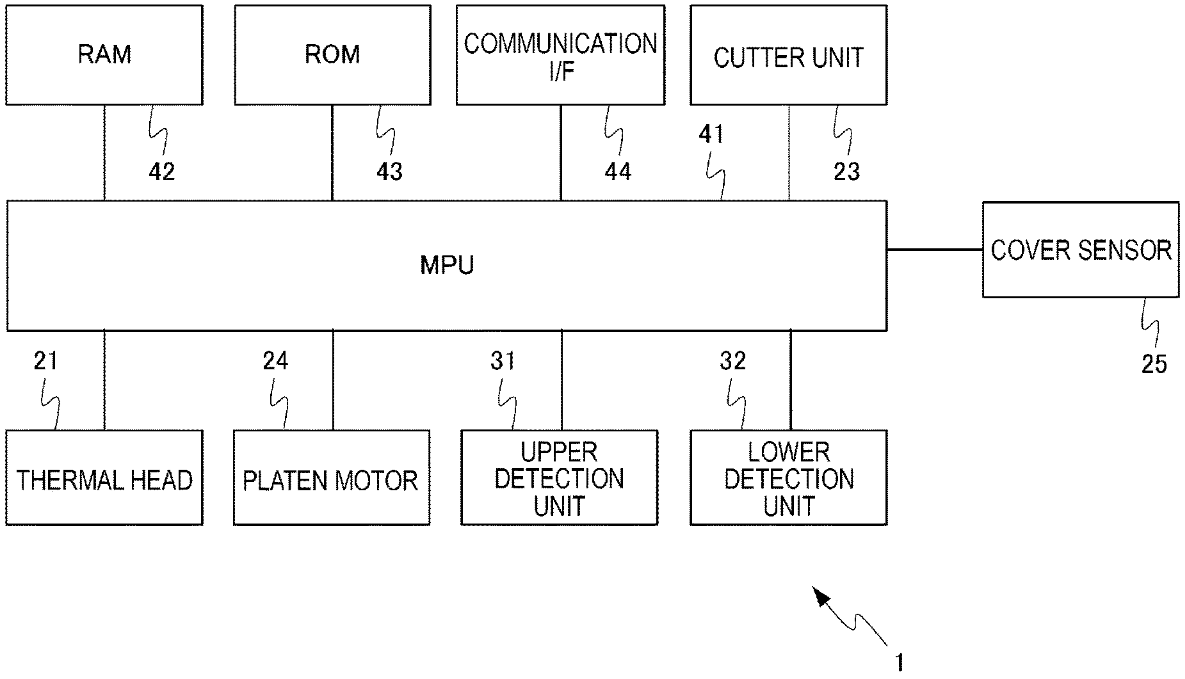
FIG. 5 is a block diagram illustrating a configuration of a control system of the thermal printer.

A configuration of a control system of the thermal printer will be described. FIG. 5 is a block diagram illustrating the configuration of the control system of the thermal printer according to the embodiment.

As illustrated in FIG. 5, the thermal printer 1 further includes a platen motor 24, a cover sensor 25, a micro processor unit (MPU) 41, a random access memory (RAM) 42, a read only memory (ROM) 43, and a communication interface (I/F) 44.

The platen motor 24 rotates the platen roller 22. The cover sensor 25 detects that the cover 101 is attached to the housing 10. The communication I/F 44 communicates with a host device of the thermal printer 1. The MPU 41 cooperates with the RAM 42 to control the thermal head 21, the platen motor 24, and the cutter unit 23. Further, The MPU 41 forms an image received from the host device on the paper P, and discharges, through the paper discharge port, the paper P having the image formed thereon. Additionally, the MPU 41 cooperates with the RAM 42 to execute a paper abnormality detection process to be described later. The ROM 43 stores programs and data used for the process executed by the MPU 41.

(Operation of Paper Abnormality Detection Process)

Figure 6:
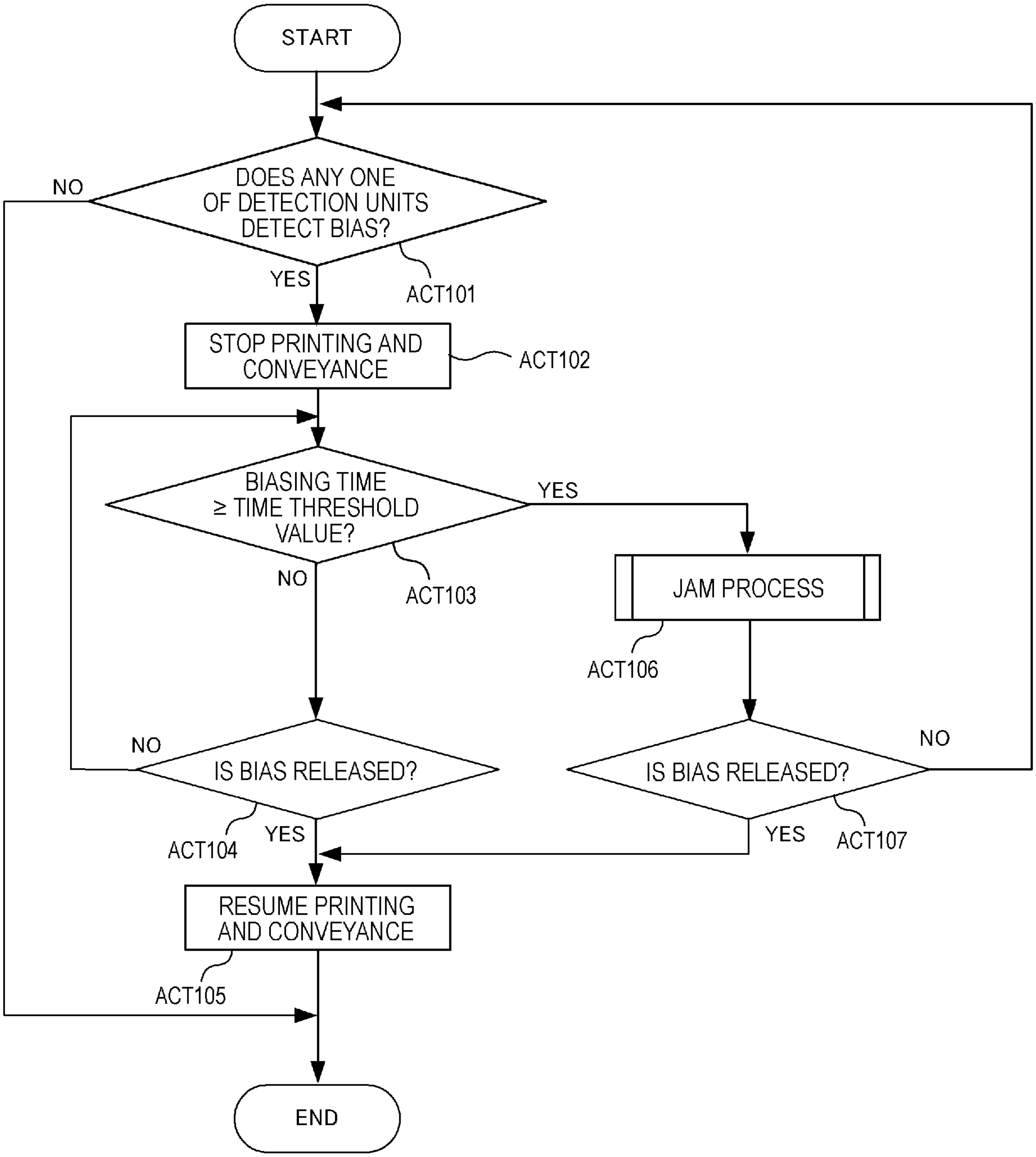
FIG. 6 is a flowchart illustrating the operation of a paper abnormality detection process.

The operation of the paper abnormality detection process according to the present embodiment will be described. FIG. 6 is a flowchart showing the operation of the paper abnormality detection process according to the present embodiment. FIGS. 7, 8, 9, and 10 are cross-sectional views of main parts illustrating the thermal printer in a state in which downward pulling, upward pulling, a paper jam, and blocking occur, respectively. It is assumed that the paper abnormality detection process is executed every predetermined cycle during the printing process.

As illustrated in FIG. 6, first, the MPU 41 determines whether at least one of the upper detection unit 31 and the lower detection unit 32 detects a bias by the paper P (ACT 101).

If at least one of the upper detection unit 31 and the lower detection unit 32 detects the bias by the paper P (ACT 101, YES), the MPU 41 stops printing the paper P and conveying the paper P (ACT 102), and determines whether a biasing time, which is a time during which a bias is continuously maintained, is equal to or greater than a preset time threshold value (ACT 103).

If the biasing time is not equal to or greater than the time threshold value (ACT 103, NO), the MPU 41 determines whether the detected bias is released (ACT 104).

If the bias is released (ACT 104, YES), the MPU 41 resumes printing the paper P and conveying the paper P (ACT 105), and one cycle of the paper abnormality detection process ends.

In this manner, in a case where the biasing time is less than the time threshold value, after downward pulling, upward pulling, blocking, and the like occur, printing and conveyance are resumed on the assumption that the downward pulling, the upward pulling, the blocking, and the like are eliminated.

Figure 7:
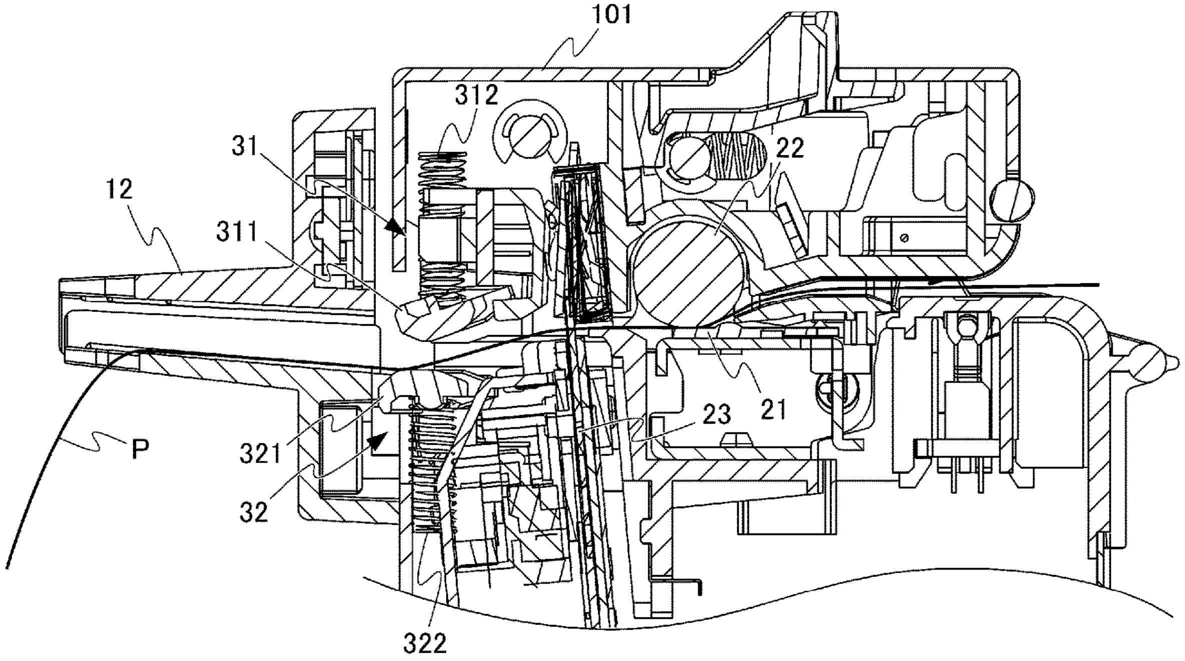
FIG. 7 is a cross-sectional view of a main part illustrating the thermal printer in a state in which downward pulling occurs.
Figure 8:
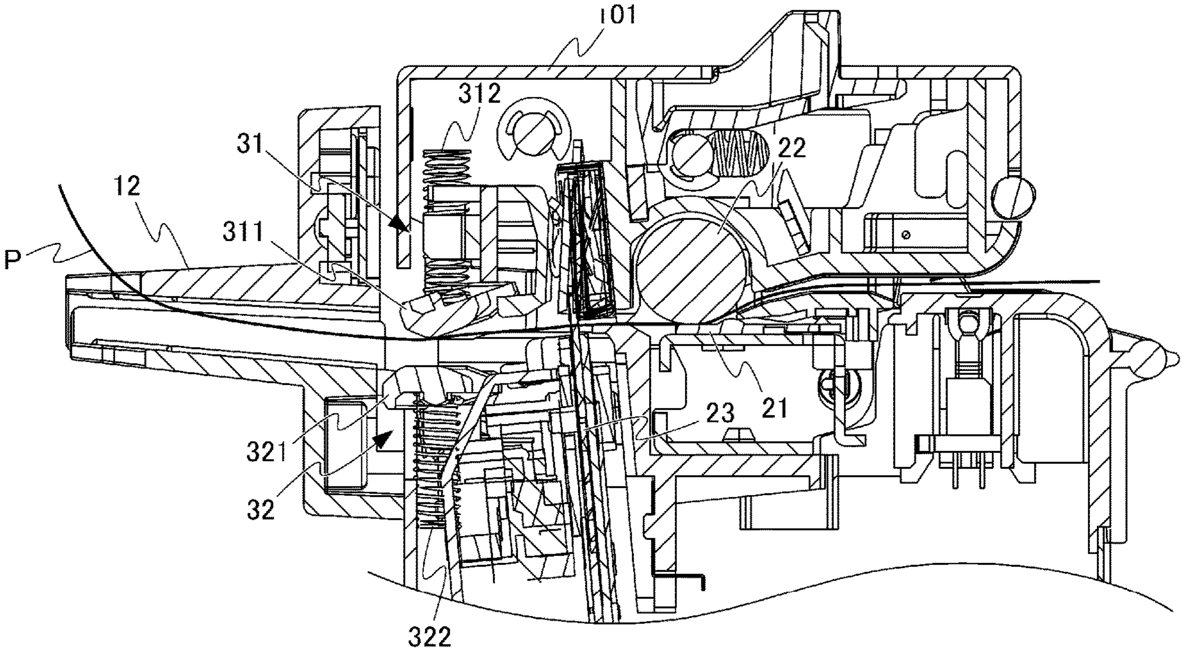
FIG. 8 is a cross-sectional view of a main part illustrating the thermal printer in a state in which upward pulling occurs.

The downward pulling is a state in which a portion of the paper P, the portion being discharged through the paper discharge port, is pulled downwards by a user, as illustrated in FIG. 7. Further, the upward pulling is a state in which a portion of the paper P, the portion being discharged through the paper discharge port, is pulled upwards by a user, as illustrated in FIG. 8. The downward pulling and the upward pulling are eliminated if the user releases the paper P.

Figure 10:
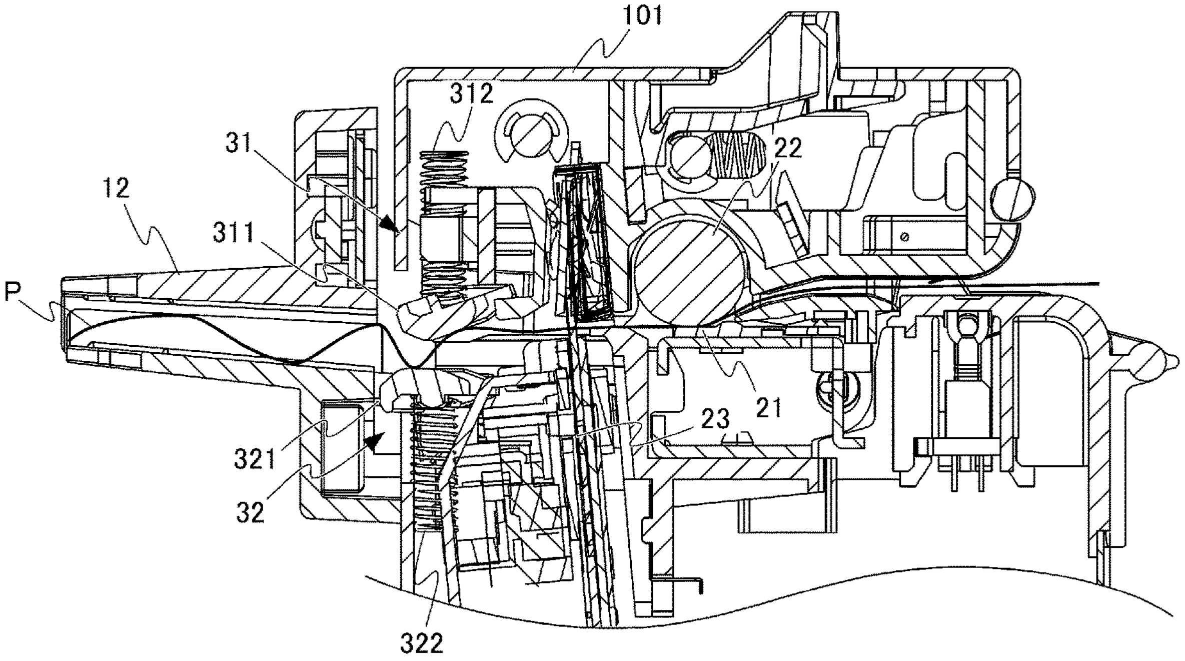
FIG. 10 is a cross-sectional view of a main part illustrating the thermal printer in a state in which blocking occurs.

As illustrated in FIG. 10, the blocking is a state in which, if the tip of the bezel 12 (opening on the left side in FIG. 10) is blocked by the user's hand or the like, the paper P is bent in the bezel 12 and in the vicinity of the paper discharge port in the paper conveyance path. The blocking is eliminated by removing the one (for example, the user's hand or the like) blocking the tip of the bezel 12.

In ACT 104, if the bias is not released (ACT 104, NO), the MPU 41 determines again whether the biasing time is equal to or greater than the time threshold value (ACT 103).

In ACT 103, if the biasing time is equal to or greater than the time threshold value (ACT 103, YES), the MPU 41 executes a jam process (ACT 106) and determines whether the bias is released (ACT 107).

Figure 9:
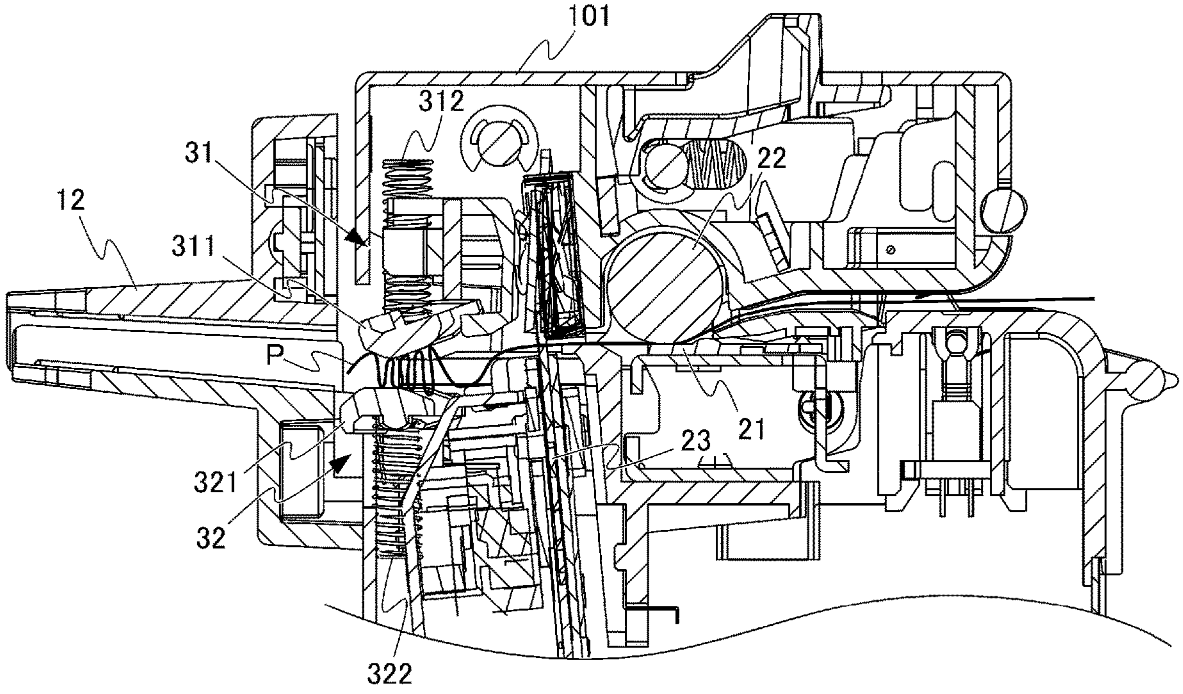
FIG. 9 is a cross-sectional view of a main part illustrating the thermal printer in a state in which a paper jam occurs.

In the jam process, as illustrated in FIG. 3, the MPU 41 detects that the cover 101 is removed, and then detects that the cover 101 is attached again. A jam, that is, a paper jam is a state in which the paper P is not discharged through the paper discharge port if an end portion of the paper P, the end portion being located on the paper discharge port side, is bent or curved, as illustrated in FIG. 9. The jam is eliminated if a user removes, from the paper conveyance path, the paper P not discharged through the paper discharge port.

If the bias is released (ACT 107), the MPU 41 resumes printing the paper P and conveying the paper P (ACT 105), and one cycle of the paper abnormality detection process ends.

On the other hand, if the bias is not released (ACT 107, NO), the MPU 41 determines again whether at least one of the upper detection unit 31 and the lower detection unit 32 detects the bias by the paper P (ACT 101).

In ACT 101, if neither the upper detection unit 31 nor the lower detection unit 32 detects the bias by the paper P (ACT 101, NO), one cycle of the paper abnormality detection process ends.

Figure 11:
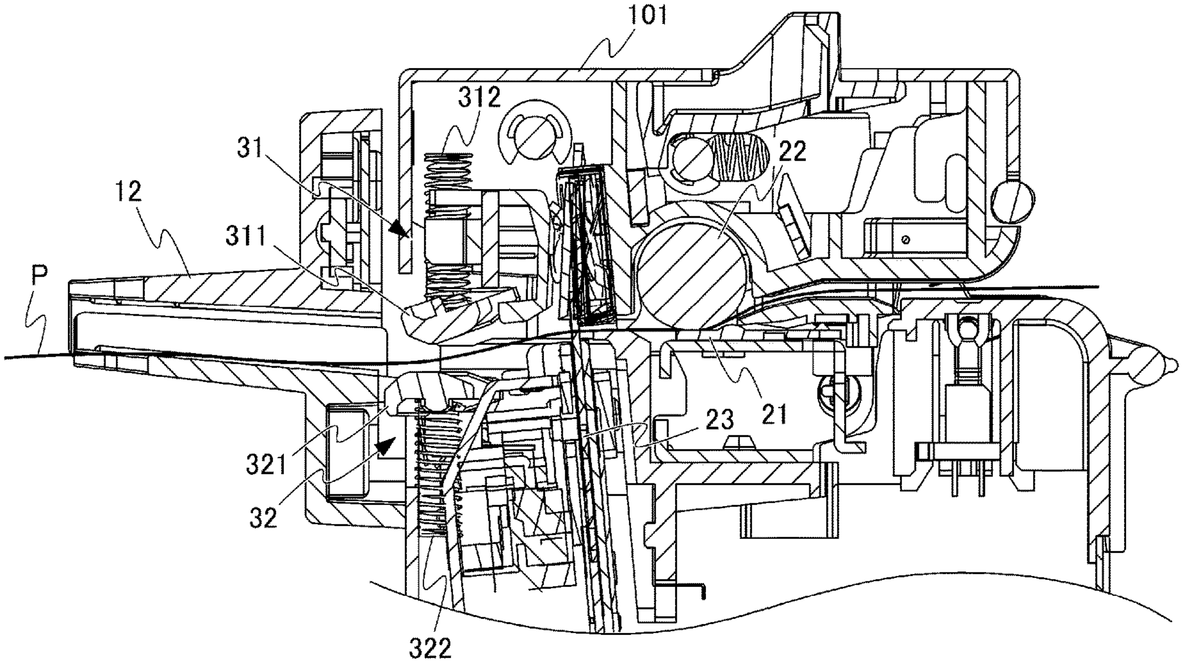
FIG. 11 is a cross-sectional view of a main part illustrating the thermal printer in a state in which a paper abnormality is not detected.

As described above, with the thermal printer 1 of the present embodiment, it is possible to more accurately detect a paper jam, blocking, upward pulling, and downward pulling, which are abnormalities generated if the paper P is discharged. It is noted that, as illustrated in FIG. 11, if neither the upper detection unit 31 nor the lower detection unit 32 detects the bias by the paper P, the paper P is discharged normally.

In the above-described embodiments, the thermal printer 1 performs printing using a direct thermal recording method, but may perform printing using any other printing method. Further, in the above-described embodiments, the medium is thermal paper wound in a roll shape, but a sheet-shaped medium such as a label, a receipt, or a ticket may be used.

Additionally, in the above-described embodiments, although it is assumed that the paper conveyance path is communicated in the direction intersecting the vertical direction, the paper conveyance path may be oriented in the vertical direction or inclined with respect to the vertical direction. Further, it suffices if the upper detection unit 31 and the lower detection unit 32 are configured with two detection units that are provided so as to face each other in the thickness direction of the paper P, specifically, in the direction intersecting the conveyance direction and the width direction of the paper.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus configured to form an image on a sheet-shaped medium using a print head and to discharge the medium through a discharge port, the apparatus comprising:

a first detector disposed closer to a side of the discharge port than to the print head in a conveyance path of the medium, the first detector being provided on one side in a thickness direction of the medium on the conveyance path, the first detector configured to detect a bias by the medium toward the one side;

a second detector provided closer to the side of the discharge port than to the print head in the conveyance path, the second detector being disposed on the other side in the thickness direction of the medium on the conveyance path, the second detector configured to detect a bias by the medium toward the other side; and a processor configured to determine that at least one of the first detector and the second detector detects the bias by the medium, determine whether a duration of the detected bias is greater than or equal to a preset time threshold value, and in response to determining that the duration of the detected bias is greater than or equal to the preset time threshold value, determine whether the detected bias is released, and determine that a cover covering the conveyance path is removed and then is attached.

2. The apparatus according to claim 1, wherein the processor is configured to determine, based on detection results from the first detector and the second detector, an abnormality related to discharging of the medium.

3. The apparatus according to claim 2, wherein the processor stops, in response to determining that the at least one of the first detector and the second detector detects the bias by the medium, formation of the image on the medium and conveyance of the medium.

4. The apparatus according to claim 3, wherein the processor resumes, in response to determining that the duration of the detected bias is less than the preset time threshold value, the formation of the image on the medium and the conveyance of the medium.

5. The apparatus according to claim 2, wherein the abnormality includes a paper jam.

6. The apparatus according to claim 1, wherein the processor resumes, when the detected bias is released, the formation of the image on the medium and the conveyance of the medium.

7. The apparatus according to claim 1, wherein the sheet-shaped medium includes paper.

8. The apparatus according to claim 1, wherein the first detector and the second detector include photoelectric sensors.

9. A medium abnormality detection method of detecting an abnormality related to discharging of a medium in an image forming apparatus configured to form, an image on the sheet-shaped medium using a print head, and discharge the medium through a discharge port, the method comprising:

detecting, by a processor, the abnormality related to the discharging of the medium, wherein the detection of the abnormality is based on a detection result from a first detector disposed closer to a side of the discharge port than to the print head in a conveyance path of the medium, the first detector being disposed on one side in a thickness direction of the medium on the conveyance path, the first detector configured to detect a bias by the medium toward the one side, and a detection result from a second detector disposed closer to the side of the discharge port than to the print head in the conveyance path, the second detector disposed on the other side in the thickness direction of the medium on the conveyance path and configured to detect a bias by the medium toward the other side;

determining, by the processor, that at least one of the first detector and the second detector detects the bias by the medium;

determining, by the processor, whether a duration of the detected bias is greater than or equal to a preset time threshold value; and in response to determining that the duration of the detected bias is greater than or equal to the preset time threshold value, determining, by the processor, whether the detected bias is released, and determining that a cover covering the conveyance path is removed and then is attached.

10. The method according to claim 9, further comprising:

stopping, when the at least one of the first detector or the second detector detects the bias by the medium, formation of the image on the medium, and conveyance of the medium.

11. The method according to claim 10, further comprising:

in response to determining that the duration of the detected bias is less than the preset time threshold value, resuming the formation of the image on the medium, and the conveyance of the medium.

12. The method according to claim 9, wherein the medium includes paper.

13. The method according to claim 9, wherein the first detector and the second detector include photoelectric sensors.

14. The method according to claim 9, wherein the abnormality includes a paper jam.

15. An image forming apparatus configured to form an image on a sheet-shaped medium using a print head and to discharge the medium through a discharge port, the apparatus comprising:

a first detector disposed closer to a side of the discharge port than to the print head in a conveyance path of the medium, the first detector being provided on one side in a thickness direction of the medium on the conveyance path, the first detector configured to detect a bias by the medium toward the one side;

a second detector provided closer to the side of the discharge port than to the print head in the conveyance path, the second detector being disposed on the other side in the thickness direction of the medium on the conveyance path, the second detector configured to detect a bias by the medium toward the other side; and a processor configured to determine, based on detection results from the first detector and the second detector, an abnormality related to discharging of the medium, stop, when at least one of the first detector and the second detector detects the bias by the medium, formation of the image on the medium and conveyance of the medium, resume, when duration of the detected bias is less than a preset time threshold value, the formation of the image on the medium and the conveyance of the medium, and determine whether the detected bias is released, when the duration of the detected bias is equal to or greater than the time threshold value, and a cover covering the conveyance path is removed and then attached.

* * * * *